(No Model.)

W. H. LLOYD.
WATER CLOSET DEMONSTRATOR.

No. 497,584. Patented May 16, 1893.

WITNESSES:

INVENTOR:

UNITED STATES PATENT OFFICE.

WILLIAM H. LLOYD, OF BOSTON, MASSACHUSETTS.

WATER-CLOSET DEMONSTRATOR.

SPECIFICATION forming part of Letters Patent No. 497,584, dated May 16, 1893.

Application filed May 10, 1892. Serial No. 432,427. (No model.)

*To all whom it may concern:*

Be it known that I, WILLIAM H. LLOYD, of Boston, in the county of Suffolk and State of Massachusetts, have invented certain new and useful Improvements in Water-Closet Demonstrators, of which the following is a specification.

My invention has reference to advertising or exhibiting apparatus for demonstrating the course and action of water in water closet and lavatory bowls and other receptacles, and has for its object to so truncate or divide the same, that a plane surface will be exposed to which a plate of glass is attached and properly cemented or otherwise made water tight, so that the interior working of the said receptacles or bowls or the course of water therein may be observed in an operative condition.

The accompanying drawings show the invention as applied to the well known "Sanitas" water closet, although it will be obvious that I am not limited, in the practice of my invention, to bowls or receptacles of any special type, my especial object being to produce an attractive device for advertising the wares of any manufacturer of bowls or receptacles, in which device the sanitary advantages of the particular bowl or receptacle illustrated, are exhibited by convincing means.

Figure 1:
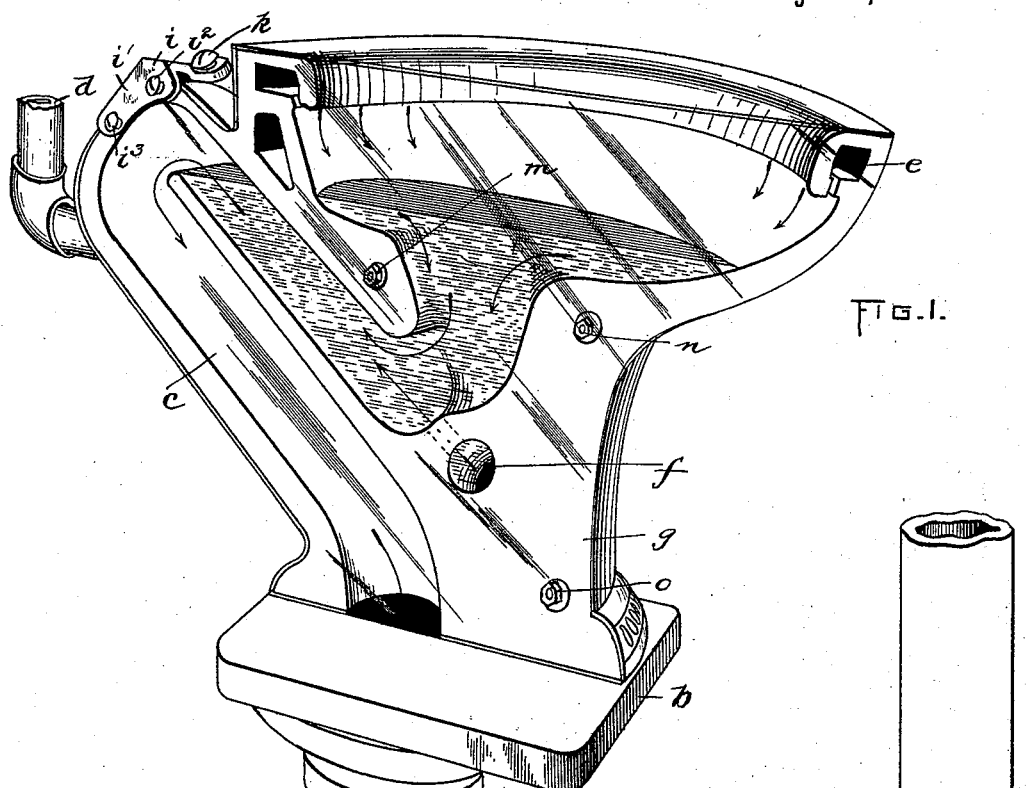
Figure 2:
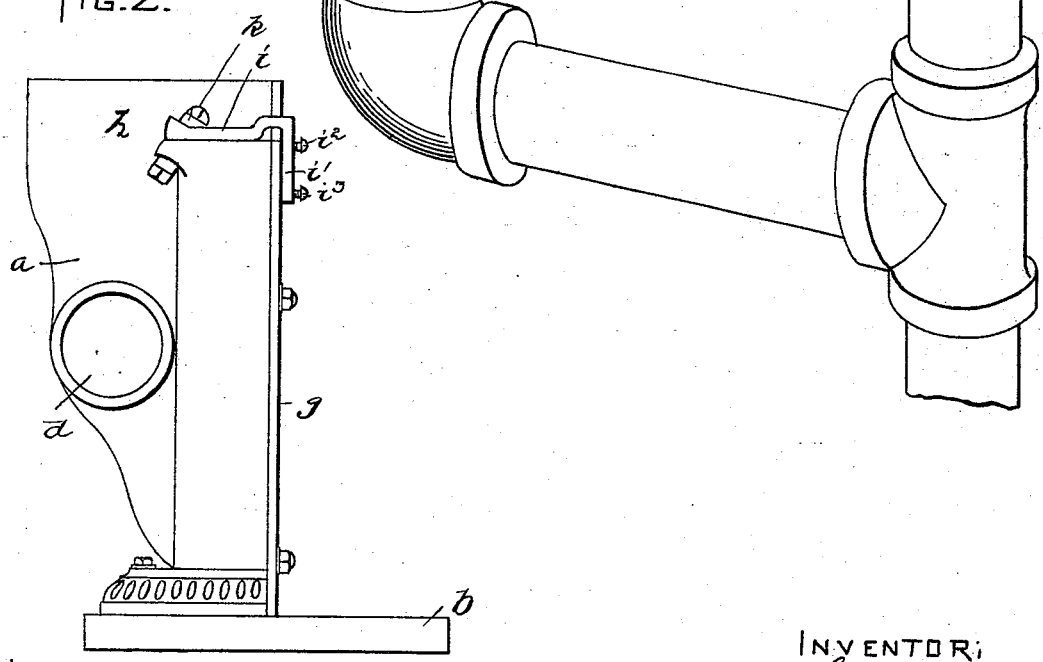

Figure 1 is a view showing the bowl centrally divided to expose the interior arrangement thereof, and a plate of glass applied thereto. Fig. 2 is a side view of the same.

The bowl $a$ supported upon the base $b$ has the main outlet passage $c$ forming a trap as shown, and leading to the bottom of the bowl. A main inlet pipe $d$ is divided, one division of which leads into the chamber $e$, and the other through division $f$, into the trap. The bowl is divided preferably, on a line which will bisect the essential parts of the bowl, so as to leave a plane skeleton surface, against which the glass $g$ is placed. On the neck of the bowl, in which is the trap, is formed the ear $h$ perforated to accommodate a suitable bolt. A clamp $i$, having the downwardly extended portion $i'$, is provided with the clamping screws $i^2$ $i^3$, which may be adjusted to bear against the surface of the glass and press the same against the bowl; a bolt $k$ secures the clamp $i$ to the ear as shown. Other bolts $m$, $n$, $o$, secured to the bowl in any suitable manner pass through the glass and are provided with nuts and washers whereby the glass is firmly held against the plane surface. Any suitable cement may be used to form a water-tight joint between the glass and plane surface.

It will be observed that I have devised means by which the interior working of many classes of apparatus may be disclosed without in the least impairing the efficiency of such apparatus, and will be useful as exhibits in many different forms.

Having now fully described my said invention, what I desire to secure by Letters Patent and therefore claim is—

A water closet bowl for advertising or demonstrating purposes comprising in its construction a bowl or receptacle having an inlet and outlet and an irregular passage therethrough from the said inlet to the outlet, said bowl being vertically truncated or cut and provided with a plane flat surface having a plate of glass secured thereto with a water tight connection, said truncated bowl being mounted upon and secured to a flat base of greater width than the width of the truncated bowl, whereby an outlet pipe below said base may be connected to the bowl, substantially as described.

In testimony whereof I have signed my name to this specification, in the presence of two subscribing witnesses, this 4th day of May, A. D. 1892.

WILLIAM H. LLOYD.

Witnesses:
C. F. BROWN,
JONATHAN CILLEY.